United States Patent [19]
Talley

[11] Patent Number: 5,408,840
[45] Date of Patent: Apr. 25, 1995

[54] REFRIGERANT OVERPRESSURE RELEASE RECOVERY SYSTEM WITH COMPRESSOR AUTO SHUTDOWN

[76] Inventor: Curtis G. Talley, 667 W. Ida St., Stayton, Oreg. 97383

[21] Appl. No.: 223,005

[22] Filed: Apr. 5, 1994

[51] Int. Cl.$^6$ ............................................. F25B 49/00
[52] U.S. Cl. ........................................ 62/126; 62/174; 62/149; 62/292
[58] Field of Search ................. 62/125, 126, 129, 149, 62/174, 292, 77

[56] References Cited

U.S. PATENT DOCUMENTS

| | | | |
|---|---|---|---|
| 3,232,070 | 2/1966 | Sparano | 62/174 |
| 5,080,132 | 1/1992 | Manz et al. | 62/292 |
| 5,181,390 | 1/1993 | Cavanaugh et al. | 62/126 |
| 5,259,204 | 11/1993 | McKeown | 62/174 |

*Primary Examiner*—John M. Sollecito

[57] ABSTRACT

A refrigerant recovery system including an interface connection to an existing refrigeration system high pressure relief valve, a check valve, a refrigerant recovery tank, and an interconnecting conduit. A Schrader type valve is affixed to the recovery tank thereby permitting service extraction of refrigerant trapped therein. Two pressure sensing switches are provided in the refrigerant recovery tank wherein a first switch has normally open contacts and is used to signal an overpressure event, and a second switch has normally closed contacts and terminates operation of the refrigeration system upon sensing an overpressure event.

3 Claims, 4 Drawing Sheets

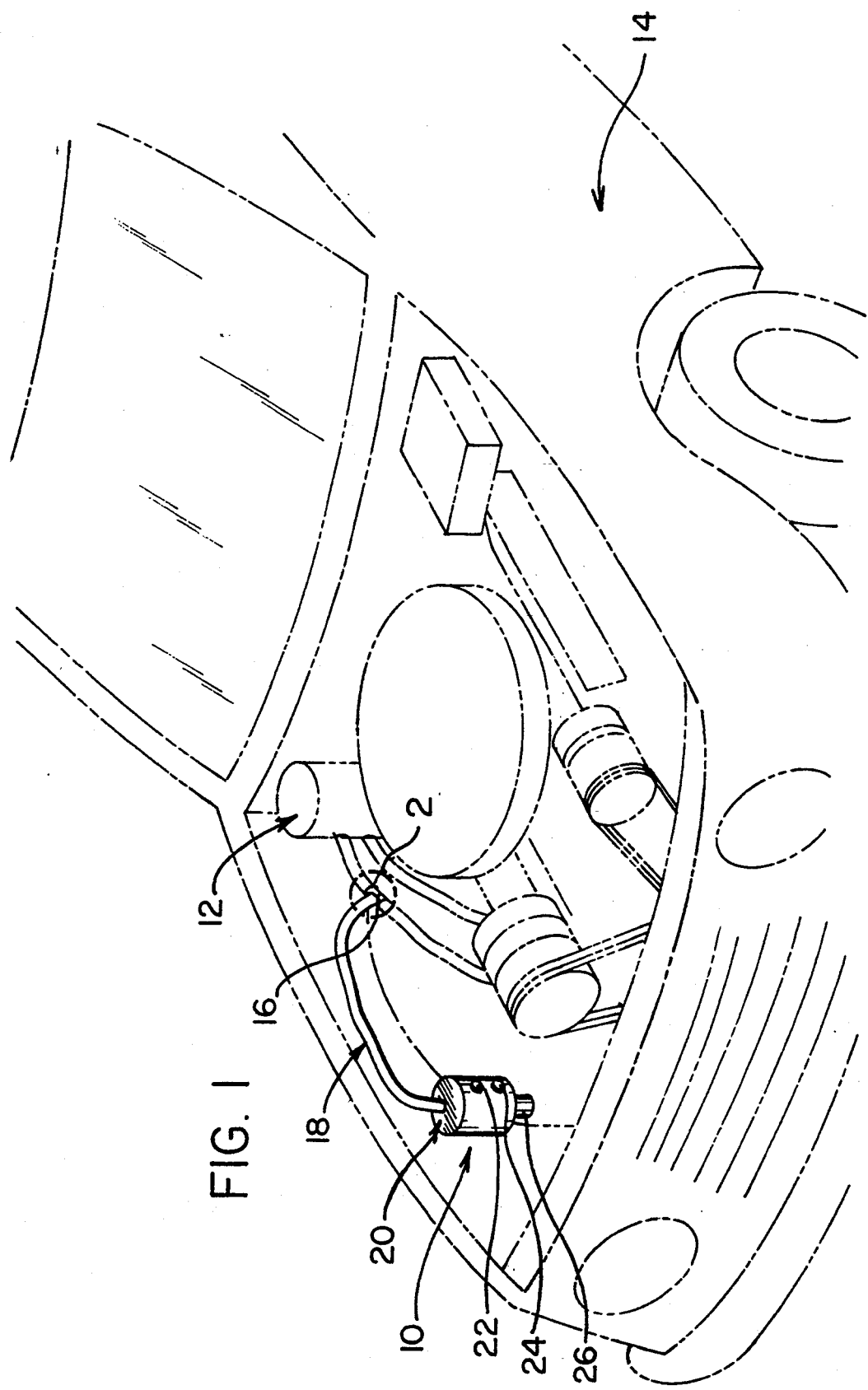

REFRIGERANT OVERPRESSURE RELEASE RECOVERY SYSTEM WITH COMPRESSOR AUTO SHUTDOWN

BACKGROUND OF THE INVENTION

1. Field of the Invention

The present invention relates to refrigerant recovery systems and more particularly pertains to a refrigerant recovery system which may be employed to capture refrigerant materials in the event of an overpressure condition wherein refrigerant is ordinarily released to the atmosphere.

2. Description of the Prior Art

The use of refrigerant recovery systems is known in the prior art. More specifically, refrigerant recovery system heretofore devised and utilized for the recovery of refrigerant materials are known to consist basically of familiar, expected and obvious structural configurations, notwithstanding the myriad of designs encompassed by the crowded prior art which have been developed for the fulfillment of countless objectives and requirements.

The present invention is directed to improving devices for an refrigerant recovery system in a manner which is safe, secure, economical and aesthetically pleasing.

For example, U.S. Pat. No. 5,168,721 to Hancock et al. discloses a refrigerant recovery device comprising a series of pipes, filters, and traps whereby refrigerant can be removed form a refrigeration system, have oil and other contaminants filtered therefrom, and be disposed in a closed container for further processing or reuse. The present invention is not intended to aid in purposeful removal of refrigerant from a refrigeration system rather it is employed continuously as a permanent system attachment to collect refrigerant escaping from a high pressure relief valve during overpressure conditions.

In U.S. Pat. No. 5,123,259 to Morgan, Sr. a refrigerant recovery system is disclosed wherein refrigerant in a refrigeration system is cooled by an external refrigeration system and thereby removed in a liquid state thereby minimizing any opportunity for loss to the atmosphere. The refrigerant so removed may have oil extracted therefrom and be recycled back into the original refrigeration system or be stored for future use. There is no provision in the Morgan, Sr. invention to collect refrigerant released during an overpressure condition particularly in automotive air conditioners. The present invention comprises a system for recovering refrigerant ordinarily released to the atmosphere during an overpressure condition wherein a relief valve discharges refrigerant upon failure. In addition an overpressure sensor is provided to warn the operator of the refrigeration system of a system failure exhibiting overpressure.

In U.S. Pat. No. 5,040,382 to Abraham a refrigerant recovery system is described. The Abraham invention comprises a refrigerant recovery system and oil trap employed to remove refrigerant from a refrigeration system, separate oil therefrom, and store refrigerant for future use. The present invention captures refrigerant which would have been released to the atmosphere under system overpressure conditions. Refrigerant recovered in the present invention may be reused or disposed of in accordance with waste disposal directives.

In U.S. Pat. No. 3,699,781 to Taylor a refrigerant recovery system is disclosed for recovery of halogenated hydrocarbon refrigerant from defective air conditioning systems. A disadvantage in this prior art lies in a lack of permanent mounting within an air conditioning system to collect refrigerant emissions produced by an overpressure failure condition. The present invention collects refrigerant released during an overpressure condition and provides a system failure signal.

U.S. Pat. No. 5,186,017 to Hancock et al. discloses a refrigerant recovery device. The disclosure teaches a refrigerant recovery system wherein a system of valves, conduit, a storage tank, and a compressor are operably interconnected to remove refrigerant from a refrigeration system by removing liquid refrigerant from a high pressure port and gaseous refrigerant from a low pressure port. The disclosure makes no provision for continually providing a refrigerant collecting system to effectively prevent refrigerant escape to the atmosphere during an overpressure event. Furthermore, there are no provisions for signalling the operator of a refrigeration system that an overpressure event has occurred. The present invention comprises a simple refrigerant collection system which is interconnected to an existing refrigeration system thereby providing for the collection of any refrigerant released during an overpressure event, and furthermore a signal is provided to alert the operator of an overpressure system failure mode.

In this respect, the refrigerant recovery system according to the present invention substantially departs from the conventional concepts and designs of the prior art, and in so doing provides an apparatus primarily developed for the purpose of collecting refrigerant vented during an overpressure failure of a refrigeration system.

Therefore, it can be appreciated that there exists a continuing need for new and improved refrigerant recovery system which can be employed to act continuously to collect any refrigerant which previously vented to the atmosphere during conditions of overpressure in a refrigeration system. In this regard, the present invention substantially fulfills this need.

As illustrated by the background art, efforts are continuously being made in an attempt to improve refrigerant recovery systems. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of refrigerant recovery systems now present in the prior art, the present invention provides an improved refrigerant recovery system construction wherein the same can be utilized for collection of refrigerant vented during a refrigeration system overpressure event. As such, the general purpose of the present invention, which will be described subsequently in greater detail, is to provide a new and improved refrigerant recovery system apparatus and method which has all the advantages of the prior art refrigerant recovery systems and none of the disadvantages.

The invention is defined by the appended claims with the specific embodiment shown in the attached drawings. For the purpose of summarizing the invention, the invention may be incorporated into an adapter engaging an existing refrigeration system high pressure relief valve, a check valve, and a recovery tank wherein a high pressure hose or tubing is employed to interconnect the aforementioned components. The recovery tank has electrical pressure switches and a Schrader valve disposed therein. The Schrader valve is introduced for the purpose of transferring refrigerant trapped within the tank to a repair station recovery system.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an improved refrigerant recovery system which captures refrigerant released from a refrigeration system during an overpressure event.

It is therefore an additional object of the present invention to provide a new and improved refrigerant recovery system which has all the advantages of the prior art refrigerant recovery systems and none of the disadvantages.

It is another object of the present invention to provide a new and improved refrigerant recovery system which may be easily and efficiently manufactured and marketed.

It is a further object of the present invention to provide a new and improved refrigerant recovery system which is of a durable and reliable construction.

An even further object of the present invention is to provide a new and improved refrigerant recovery system which is susceptible of a low cost of manufacture with regard to both materials and labor, and which accordingly is then susceptible of low prices of sale to the consuming public, thereby making such refrigerant recovery systems economically available to the buying public.

Still yet another object of the present invention is to provide a new and improved refrigerant recovery system which provides in the apparatuses and methods of the prior art some of the advantages thereof, while simultaneously overcoming some of the disadvantages normally associated therewith.

Still another object of the present invention is to provide a new and improved refrigerant recovery system which provides an alarm signal when an overpressure event has occurred.

Yet another object of the present invention is to provide a new and improved refrigerant recovery system which is simplistic an of sufficiently small size to be useful in automotive applications, and most particularly to be included as an integral part of automobile air conditioning systems.

Even still another object of the present invention is to provide a new and improved refrigerant recovery system which is readily interfaceable with conventional repair shop air conditioning refrigerant recovery systems thereby enabling removal of refrigerant captured by the present invention by conventional refrigerant handling equipments.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a right perspective view of the refrigerant recovery system showing the interconnection of the system in an automotive application.

DESCRIPTION OF THE PREFERRED EMBODIMENT

Figure 4:
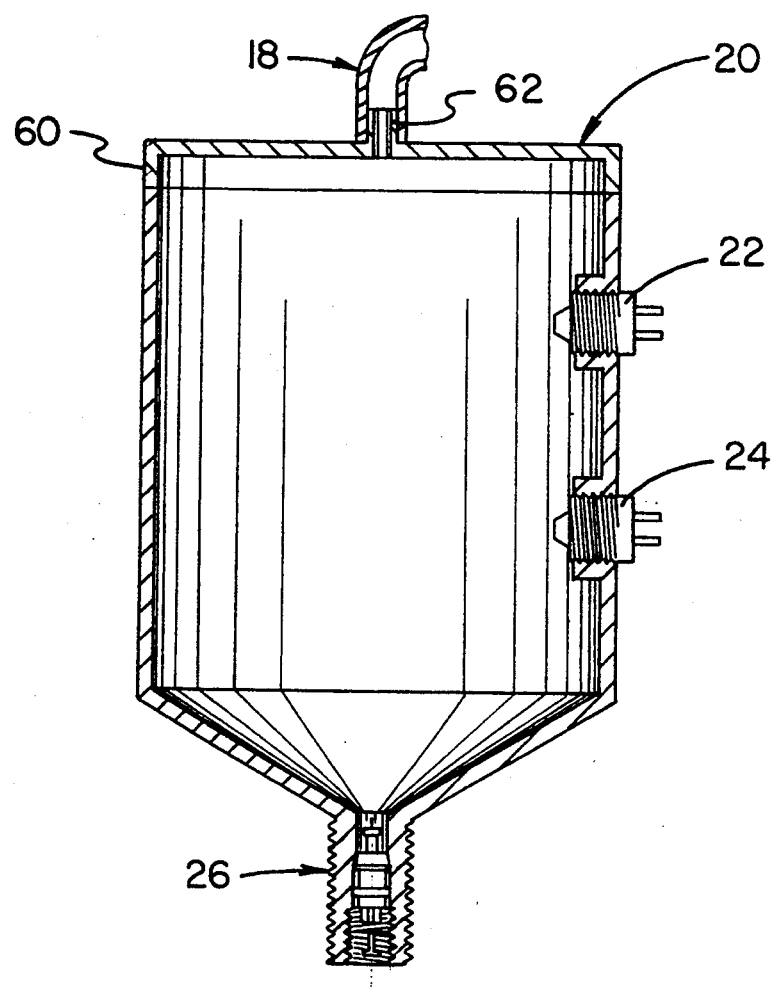
FIG. 4 is sectional view of the refrigerant recovery system taken substantially upon the plane indicated by section line 4—4 of FIG. 3.

With reference now to the drawings, and in particular to FIG. 1 thereof, a new and improved refrigerant recovery system embodying the principles and concepts of the present invention and generally designated by the reference numeral 10 will be described.

From an overview standpoint, the refrigerant recovery system 10 is adapted for use with refrigeration systems such as employed in air conditioning and more particularly in automotive air conditioning to capture escaping refrigerant ordinarily lost during an overpressure failure. See FIG. 1. The refrigerant recovery system 10 is introduced within the air conditioning system 12 of an automobile 14 by application of a high pressure coupling device 16 which interfaces the refrigerant recovery system 10 to the air conditioning system 12 and additionally directs refrigerant ordinarily lost during an overpressure event through conduit 18 to recovery tank 20. Recovery tank 20 is equipped with a high pressure indicator switch 22, a refrigeration system disabling switch 24, and a Schrader valve port 26 for removal of captured refrigerant.

More specifically, it will be noted that the refrigerant recovery system 10 comprises a high pressure coupling device 16, a high pressure conduit 18, a high pressure recovery tank 20, and a Schrader valve port 26. High pressure coupling device 16 comprises a housing member 30 and a check valve assembly 32. Housing member 30 comprises a first end portion 34, a central portion 36, and a second end portion 38. First end portion 34 comprises an interface to an existing refrigeration system and is generally configured as a centrally disposed through hole 35 threadedley engaging the refrigeration system 12 high pressure relief valve. Sealing may be achieved using gaskets or thread compounds applied prior to mating first end portion 34 with refrigeration system 12. First end portion 34 may alternately engage refrigeration system 12 using a captured nut and sealing gasket. Some refrigeration systems, however, may require the employment of a slidably engaging hose type interface wherein a section of high pressure hose is clampedly or threadedly attached at one end to first end portion 34 and, at an opposing end, to refrigeration system 12.

Central portion 36 comprises a chamber for check valve assembly 32 comprising a large diameter portion 40 loosely engaging check valve assembly 32, an exit port 42, and a valve seat portion 44. Second end portion 38 comprises a substantially tubular interface whereupon conduit 18 is clampedly disposed. Or, alternately, second end portion 38 may threadedly engage a fitting member affixed to an end of conduit 18. Check valve assembly 32 comprises a ball member 50 and a compression spring member 52. Ball member 50 is of polymeric or metallic composition solid or hollow in form, and has a sufficiently smooth outer surface to sealably preclude transfer of liquids or gases internal to conduit 18 into the centrally disposed hole of first portion 34. Compression spring member 52 is of helical structure and of sufficient spring constant to maintain a seated condition of ball member 50 under conditions of vibration and pressure variation anticipated during use. Excessive values of spring constant are to be avoided in selecting compression spring member 52 because the refrigerant escaping from the overpressure relief valve of refrigeration system 12 is required to overcome the force of compression spring member 52 in order to be captured. Check valve assembly 32 may alternately comprise a platelike or a substantially conical replacement for ball member 50.

Conduit 18 comprises a high pressure flexible hose or equivalently a high pressure metal tubing bent at various locations to fit particular refrigeration system configurations. Conduit 18 may be of arbitrary length and industry standard internal diameters may be employed.

Figure 2:
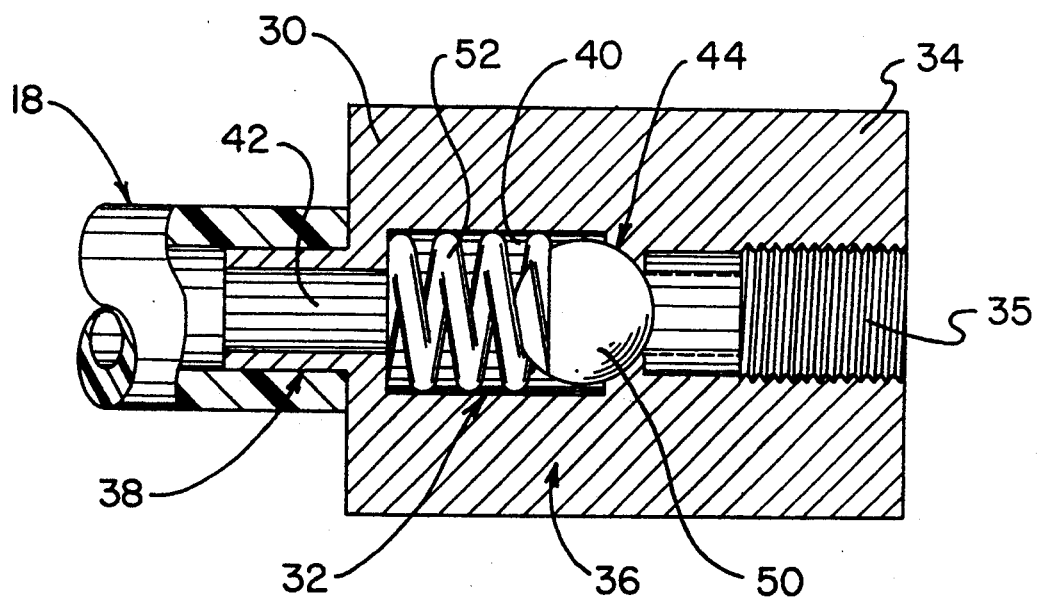
FIG. 2 is a fragmentary sectional view of the refrigerant recovery system taken substantially upon the plane indicated by the section line 2—2 of FIG. 1 and showing a ball check valve assembly.
Figure 3:
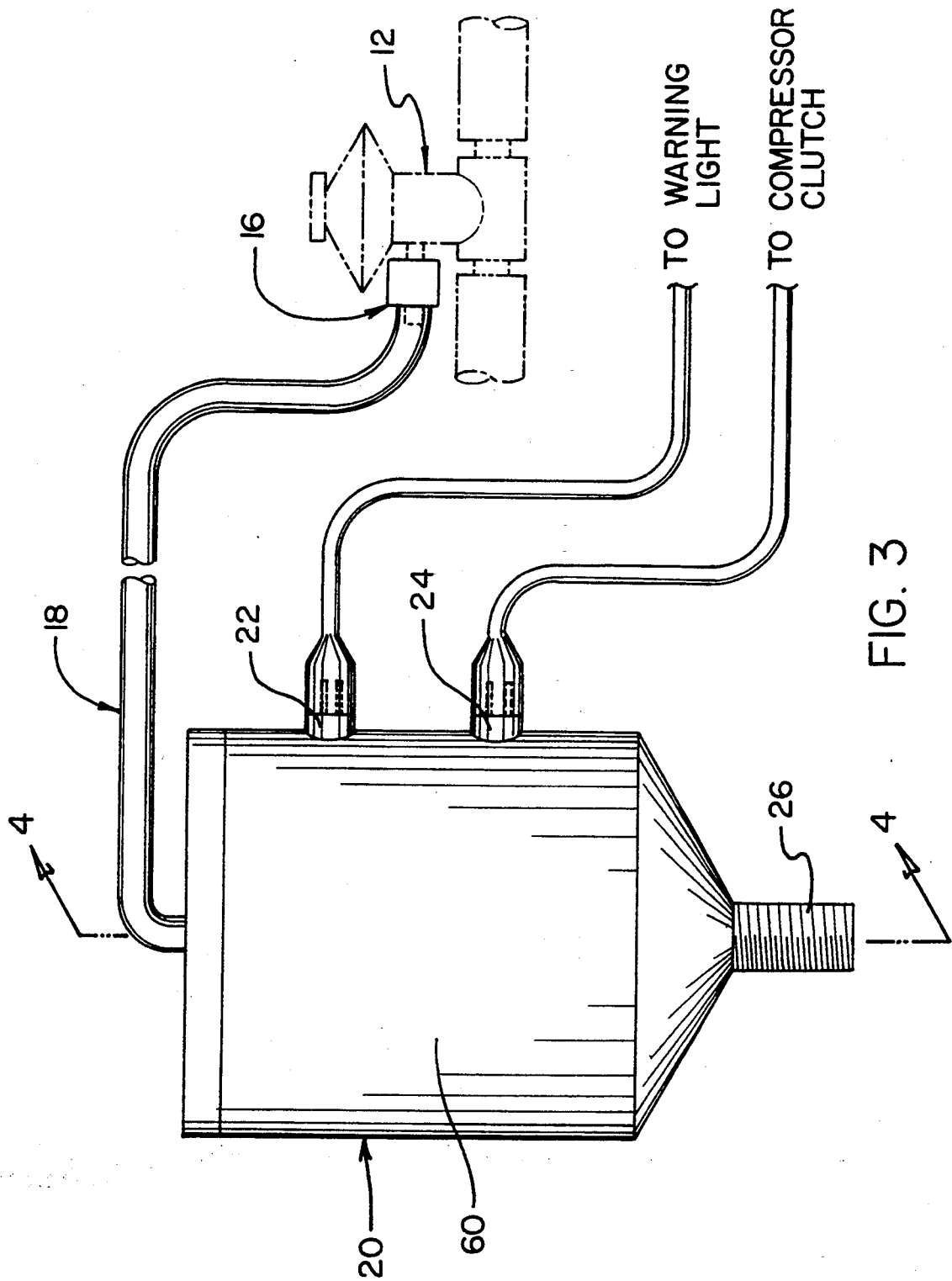
FIG. 3 is a fragmentary side elevational view of the refrigerant recovery system showing the high pressure recovery tank.

High pressure recovery tank 20 comprises a housing 60, a refrigerant entrance port 62, a Schrader valve port 26, a high pressure indicator switch 22, and a refrigeration system disabling switch 24. See FIGS. 2 and 3. Housing 60 is of durable construction and capable of withstanding relatively high pressures associated with the confinement of liquid and gaseous refrigerant introduced under pressure. Welded steel construction is a suitable configuration for the housing 60. Refrigerant entrance port 62 comprises a tubular structure having sufficient length and textural qualities to provide sealable attachment of conduit 18 using clamps or other means. Alternately, refrigerant entrance port 62 threadedly engages a terminus of conduit 18. Schrader valve port 26 comprises a standardized refrigeration system port employed for installing or removing refrigerants and other additives within a refrigeration system.

Schrader valves in common use in automotive air conditioners and tires generally have a spring loaded seal which is releasably engaged by a centrally located pin member. Schrader valve port 26 may have a variety of dispositions upon housing 60, however placement at a low point in the housing facilitates rapid extraction of refrigerant during servicing if at least some liquid refrigerant is entrapped therein. High pressure indicator switch 22 threadedly engages housing 60 and provides for electrical circuit closure upon pressurization of high pressure recovery tank 20 by refrigerant during a refrigeration system overpressure event. Refrigeration system disabling switch 24 threadedly engages housing 60 and produces an open electrical circuit upon pressurization of high pressure recovery tank 20 by refrigerant during a refrigeration system overpressure event.

Figure 5:
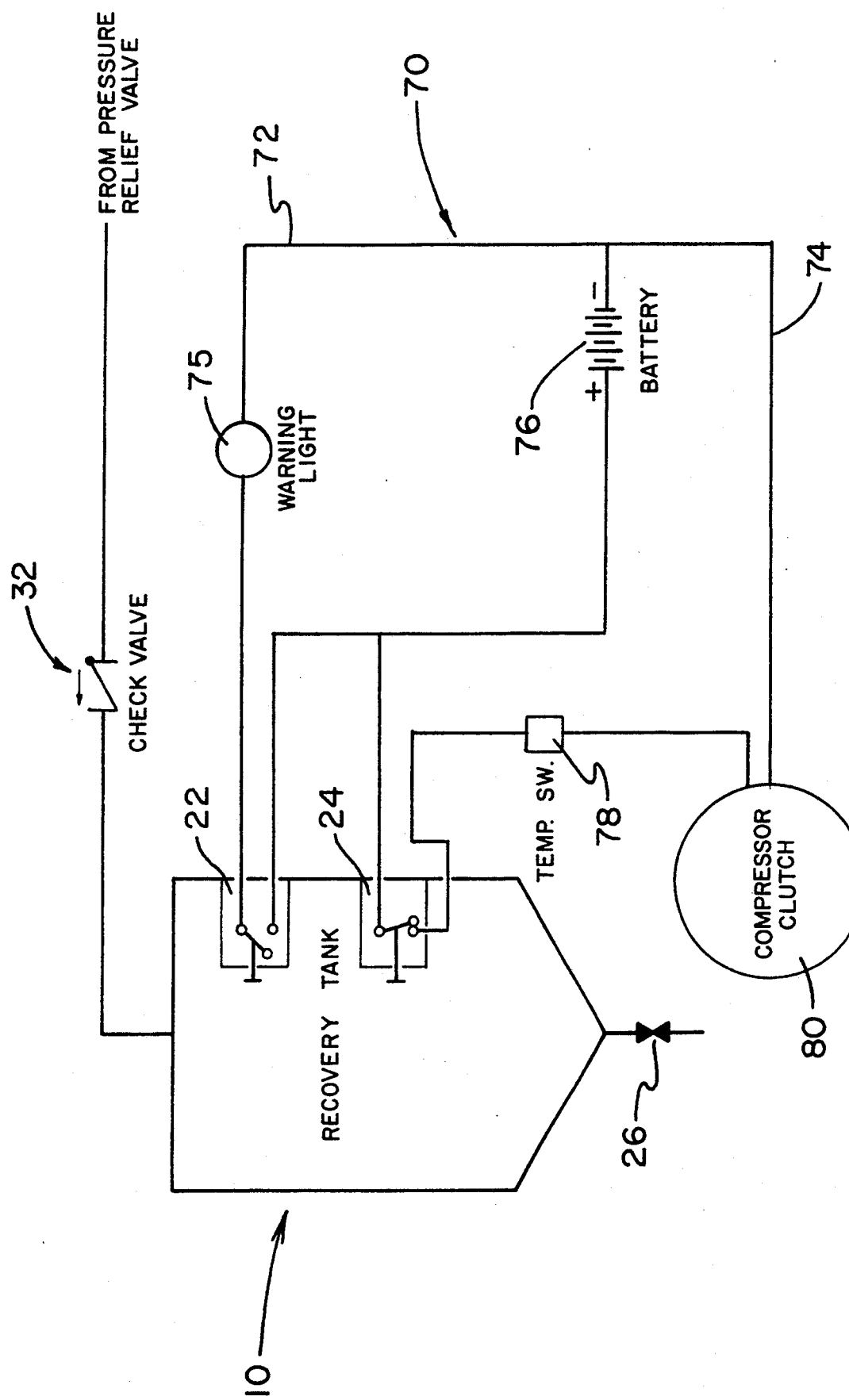
FIG. 5 is an electrical schematic of a refrigerant recovery system.

Electrical circuit 70 comprises a first normally open circuit 72 and a second normally closed circuit 74 wherein both circuits are provided electrical power in a parallel arrangement by battery 76. See FIG. 5. Normally open circuit 72 comprises a series disposition of high pressure indicator switch 22, warning light 74, and battery 76. Upon pressurization of high pressure recovery tank 20 the high pressure indicator switch 22 closes circuit 72 and warning light 74 illuminates thereby indicating refrigeration system 12 failure from an overpressure event. Normally closed circuit 74 comprises a series disposition of refrigeration system disabling switch 24, temperature control switch 78, compressor clutch 80, and battery 76. Upon pressurization of high pressure recovery tank 20 the refrigeration system disabling switch 24 opens circuit 74 and compressor clutch 80 is de-energized thereby disabling the refrigeration system 12. Check valve assembly 32 maintains pressurization of high pressure recovery tank 60 independently of the state of pressurization of the refrigeration system 12 thereby disabling refrigeration system 12 until high pressure recovery tank 60 is depressurized by removal of refrigerant trapped therein.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by Letters Patent of the United States is as follows:

1. A new and improved refrigerant recovery system for capturing refrigerant released during a refrigerant system overpressure event comprising:

a refrigerant system interface means having a threadedly engaging portion and a body portion wherein said threadedly engaging portion sealably engages a threaded portion of a venting port of a high pressure release valve;

a check valve formed of a housing containing a spring member, a ball, and a seat member in series disposition, the check valve coupled to the body portion of the refrigerant system interface means for permitting relatively free passage of liquid and gaseous refrigerant therethrough in one direction from the venting port of the high pressure release valve and precluding such passage in an opposite direction;

a steel recovery tank capable of holding for an indefinite time refrigerant therein in a pressurized condition and having a quick-disconnect refrigerant access valve extended therefrom for draining refrigerant;

a tubular conduit coupled between the check valve and recovery tank for conveying refrigerant from the check valve to the recovery tank; and an electrical circuit for monitoring and controlling pressurization of the recovery tank with the circuit further comprising:

an electrical power source for supplying a flow of electrical current;

indicator means interconnected with the power source for providing a visual indication of failure from an overpressure event in the recovery tank;

a compressor electromagnetic clutch interconnected with the power source;

a normally open high pressure indicator switch engaging the recovery tank and serially interconnected with the indicator means and the power source; and a normally closed refrigeration disabling switch engaging the recovery tank and serially interconnected with the compressor electromagnetic clutch and the power source.

2. A new and improved refrigerant recovery system for capturing refrigerant release during a refrigerant system overpressure event comprising:

a refrigerant system interface means attaching to a venting port of a high pressure release valve;

a check valve permitting refrigerant transfer solely into a refrigerant recovery system;

a recovery tank capable of holding for an indefinite time refrigerant therein in a pressurized condition and having a recovery tank refrigerant access valve for draining refrigerant;

a conduit conveying refrigerant from the check valve to the recovery tank;

an electrical power source for supplying a flow of electrical current;

indicator means for providing a visual indication of failure from an overpressure event in the recovery tank;

a normally closed temperature control switch interconnected with the electrical power source; and one or more pressure sensory switches controlling the flow of electrical current in response to pressurization of the recovery tank in which one of the pressure sensory switches comprises a single pole, normally closed switch wherein said normally closed switch is serially interconnected with the temperature control switch and the electrical power source.

3. A new and improved refrigerant recovery system for capturing refrigerant release during a refrigerant system overpressure event comprising:

a refrigerant system interface means attaching to a venting port of a high pressure release valve;

a check valve permitting refrigerant transfer solely into a refrigerant recovery system;

a recovery tank capable of holding for an indefinite time refrigerant therein in a pressurized condition and having a recovery tank refrigerant access valve for draining refrigerant;

a conduit conveying refrigerant from the check valve to the recovery tank;

an electrical power source for supplying a flow of electrical current;

a compressor electromagnetic clutch interconnected with the electrical power source; and one or more pressure sensory switches controlling the flow of electrical current in response to pressurization of the recovery tank in which one of the pressure sensory switches comprises a single pole, normally closed switch wherein said normally closed switch is serially interconnected with a compressor electromagnetic clutch and the electrical power source.

* * * * *